United States Patent [19]
Tamutus

[11] 4,341,591
[45] Jul. 27, 1982

[54] METHOD OF FABRICATING A COLOR-SELECTION STRUCTURE FOR A CRT

[75] Inventor: Donald J. Tamutus, Mercerville, N.J.

[73] Assignee: RCA Corporation, New York, N.Y.

[21] Appl. No.: 252,250

[22] Filed: Apr. 8, 1981

[51] Int. Cl.³ .......................... B44C 1/22; C03C 15/00; C03C 25/06; C23F 1/02

[52] U.S. Cl. .................................. 156/630; 29/25.15; 29/25.18; 156/640; 156/644; 156/652; 156/661.1; 313/403; 313/355; 430/23; 430/312; 430/313; 430/318

[58] Field of Search ............... 156/630, 644, 650, 651, 156/652, 655, 661.1, 640; 29/25.13, 25.14, 25.17, 25.18; 313/402, 403, 329, 355; 430/5, 6, 7, 23, 312, 313, 320, 321, 328, 329, 318

[56] References Cited

U.S. PATENT DOCUMENTS

| | | | |
|---|---|---|---|
| 3,778,900 | 12/1973 | Haining et al. | 156/630 X |
| 4,066,923 | 1/1978 | van Esdonk | 313/402 |
| 4,107,569 | 8/1978 | Ronde | 313/402 |
| 4,164,059 | 8/1979 | van Esdonk | 29/25.15 |
| 4,188,562 | 2/1980 | van Oostrum | 313/402 |
| 4,222,159 | 9/1980 | Koorneef | 29/25.14 |
| 4,240,869 | 12/1980 | Diepers | 156/644 X |

*Primary Examiner*—William A. Powell
*Attorney, Agent, or Firm*—E. M. Whitacre; D. H. Irlbeck; L. Greenspan

[57] ABSTRACT

Method comprises providing a blank laminate consisting essentially of a positive-acting photosolubilizable central layer, first and second etchable metal layers adhered to opposite sides of the central layer and first and second etch-resistant stencils contacting the outer major surfaces of the first and second metal layers. The stencils have different, related open areas therethrough which leave selected portions of the metal layers unprotected. The unprotected portions of the first and second metal layers are etched through, thereby producing first and second openings in the metal layers. Then the central layer is exposed to actinic light through the first and/or second openings, thereby solubilizing selected portions of the central layer, which solubilized portions are then removed.

4 Claims, 8 Drawing Figures

METHOD OF FABRICATING A COLOR-SELECTION STRUCTURE FOR A CRT

BACKGROUND OF THE INVENTION

This invention relates to an improved method of making a quadrupolar focusing color-selection structure for a CRT (cathode-ray tube).

A shadow-mask-type color television picture tube, which is a CRT, comprises generally an evacuated envelope having therein a target comprising an array of phosphor elements of three different emission colors arranged in color groups in cyclic order, means for producing three convergent electron beams directed toward the target, and a color-selection structure including an apertured masking plate closely spaced from the target. The masking plate shadows the target, and the differences in convergence angles permit the transmitted portions of each beam to select and excite phosphor elements of the desired emission color.

One family of color-selection structures is referred to as electrostatic quadrupolar focus masks. These structures have, as a common feature, an array of quadrupolar electrostatic focusing lenses, each lens consisting of metal electrodes held in closely-spaced relation by electrical insulators, which provide structural integrity for the structure and hold off the voltage required for focusing.

One such structure consists of two spaced sets of spaced, parallel electrode strips at right angles to one another forming apertures therebetween. In a typical focus mask, the apertures are on about 0.77 mm (30 mil) centers in the horizontal direction and 0.46 to 0.77 mm (18 to 30 mil) centers vertically. The electrical transmission of such a structure is about 50%, and the voltage across the two sets of strips during operation is about 600 volts dc. A second such structure comprises an apertured plate onto which is bonded a set of parallel strip electrodes such that each aperture is bisected by an electrode strip. A third structure comprises an apertured plate onto which is bonded a set of parallel strip electrodes such that there are electrodes on opposite sides of each aperture of the plate. The dimensions of and voltages employed in the second and third structures are similar to those of the typical structure mentioned above.

In any of these and similar structures, it is a major problem to construct, in a single focus mask which may be about 38 by 51 centimeters in size, an array of about 250,000 or more lenses that are precisely sized and positioned as is required for use in a CRT. Though not obvious, new fabrication techniques and new materials have been devised for other unrelated purposes which can be adapted toward this end.

SUMMARY OF THE INVENTION

The novel method comprises a combination of steps including providing a blank laminate consisting essentially of a positive-acting photosolubilizable central insulator layer, first and second etchable metal layers adhered to opposite major surfaces of said insulator layer, and first and second etch-resistant stencils contacting major surfaces of said first and second metal layers respectively. The stencils have different, related open areas therethrough which leave selected portions of said metal layers unprotected. The method includes etching through the first metal layer in selected portions of the first metal layer, thereby producing first openings in the first metal layer, and etching through the second metal layer in the selected portions of the second metal layer, thereby producing second openings in the second metal layer. Then, the insulator layer is exposed to actinic light through at least one of said first openings and said second openings, thereby solubilizing selected portions of the insulator layer. Then, the solubilized portions of the insulator layer are removed. Optionally, the stencils may be removed also.

The stencils and the stencil layer each may be made by coating a layer of photoresist material to the metal surface of interest. The insulator layer may be made by laminating or otherwise joining together two adjacent positive-acting photoresist layers. The stencils may be made by exposing positive- or negative-acting photoresist layers to light images and then developing the exposed layers. It is preferred to undercut the insulator layer under the etched first and second metal layers.

DETAILED DESCRIPTION OF THE PREFERRED EMBODIMENTS

The first step in the novel method is to provide a blank laminate including five layers arranged as follows: a central layer of positive-acting, photosolubilizable material, first and second etchable metal layers contacting each major surface of the central layer, and first and second etch-resistant stencils contacting the outer surfaces of the first and second metal layers respectively. This laminate is preferably made by the following procedure which is illustrated in FIGS. 1 and 2.

Figures 1, 2, 3, 4, 5, 6:
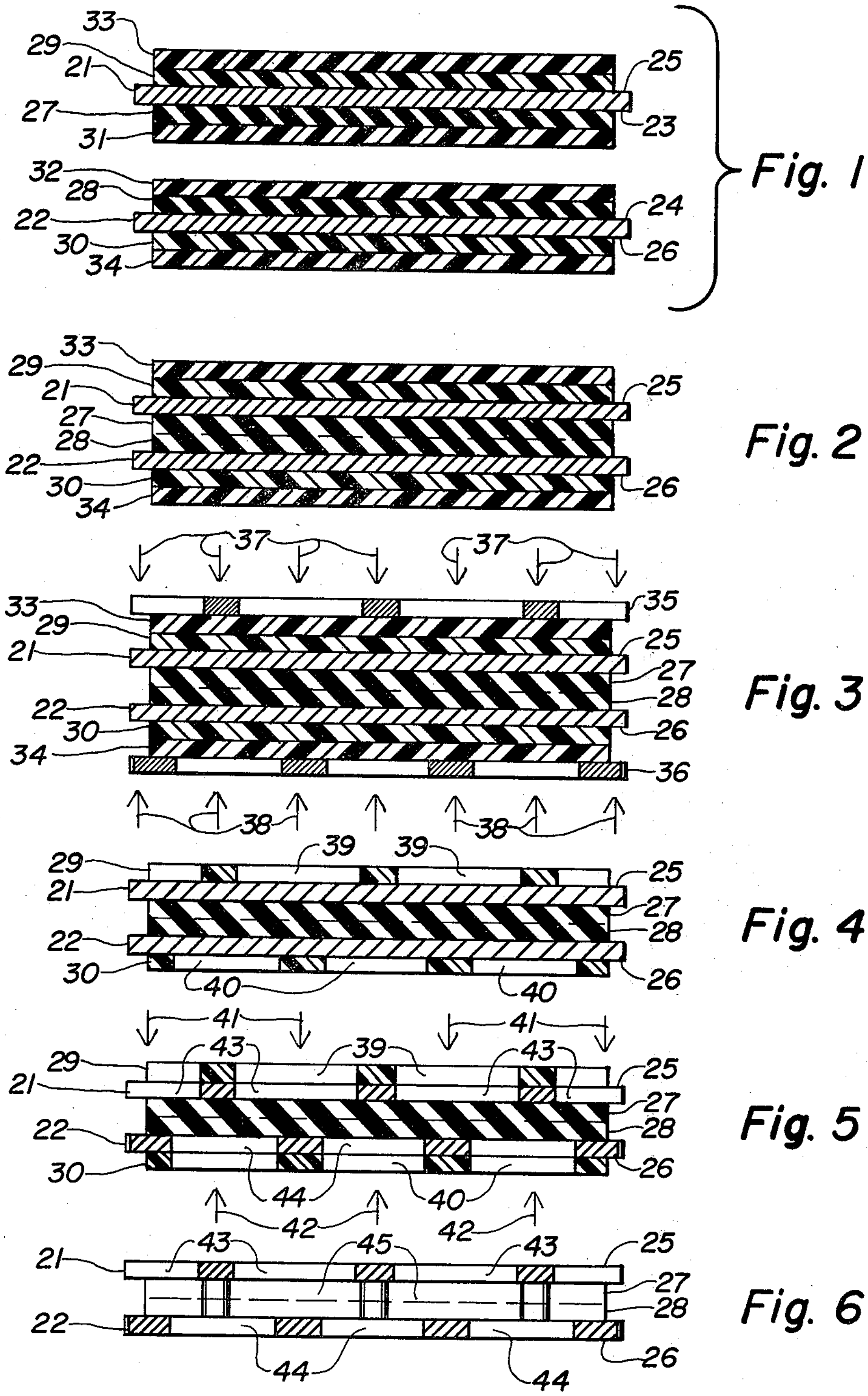
FIGS. 1 to 6 are sectional views of a laminate, symbolically illustrating a sequence of steps in a first embodiment of the novel method.

In FIG. 1, two separate sheets 21 and 22 of thin metal of about the same length and width are each coated on the one side, 23 and 24 respectively, with a positive-acting photosolubilizable insulator layer, 27 and 28 respectively, and coated on the other side, 25 and 26 respectively, with a photoresist layer, 29 and 30 respectively. The photoresist layers 29 and 30 may be either positive-acting or negative-acting. In this embodiment, the metal sheets 21 and 22 are of beryllium-copper alloy, specifically Berylco 25 about 0.05 mm (2 mils) thick, although other alloys or metals and other thicknesses can be used.

In this embodiment, the insulator layers 27 and 28 are a commercial product known as Shipley Dry Film Photoresist XP-7631-9 marketed by Shipley Company, Inc., Newton, Mass., although other positive-acting photosolubilizable materials can be used. This product is marketed as precast films about 0.018 mm (0.7 mil) thick that are each sandwiched between a sheet of Mylar and a sheet of polyethylene. The sheets of polyethylene are removed, and the insulator layers 27 and 28 are laminated to one of the major surfaces of the metal sheets 21 and 22, respectively, with the Mylar sheets 31 and 32, respectively, still in place.

In this embodiment, the photoresist layers 29 and 30 are the same positive-acting commercial product as are the insulator layers 27 and 28. Alternatively, the photoresist layers 29 and 30 may be a negative-acting commercial product, for example, the product known as Riston 210R marketed by E. I. du Pont, Wilmington, Del. In either case, the polyethylene sheets are removed, and the photoresist layers 29 and 30 are laminated to the other major surfaces 25 and 26 respectively of the metal sheets 21 and 22 with the Mylar sheets 33 and 34 respectively still in place. The insulator layer and the photoresist layer may be laminated to each metal sheet 21 and 22 at the same time or may be laminated thereto sequentially.

Next, as shown in FIG. 2, the Mylar sheets 31 and 32 on the insulator layers 27 and 28 are peeled off, and the insulator layers 27 and 28 are placed against one another and joined together. A preferred procedure is to place the two sublaminates in a fold of hard-finished dust-free paper and to run the combination between two heated pressure rollers to join the insulator layers 27 and 28 together into a single central layer. Then, the blank laminate is removed from the fold of paper and is ready to continue in the novel method.

First and second photographic working masters 35 and 36 are placed, one on each side of the laminate, against the outer surfaces of the Mylar sheets 33 and 34 respectively, as shown in FIG. 3. The patterns on the masters 35 and 36 are different, but the patterns are related to one another. As such they must be suitably aligned so that they are registered with one another. In this embodiment, the first master 35 is a pattern of parallel electrode strips, and the second master 36 is a pattern of an apertured plate. Then, as indicated by the arrows 37 and 38, the photoresist layers 29 and 30 are exposed to actinic light which, in this example, is long ultraviolet radiation, through the masters 35 and 36 and the Mylar sheets 33 and 34. The actinic light has the effect of solubilizing the exposed regions of the positive-acting photoresist in this embodiment (or insolubilizing the exposed regions where the photoresist is a negative-acting photoresist) in some particular solvent.

After the exposure is complete, the masters 35 and 36 are removed, and the Myler sheets 33 and 34 are peeled off the photoresist layers 29 and 30. Next, the exposed photoresists are developed; that is, the more-soluble portions of the layers are removed and the less-soluble portions of the layers are retained in place thereby producing stencils on the surfaces 25 and 26. In this embodiment, the exposed layer 29 and 30 are developed with a commercial aqueous developing solution known as Shipley Developer XP-7717-1 marketed by Shipley Company, Inc.

After developing, as shown in FIG. 4, the first photoresist layer 29 has first open areas 39 therethrough which leave unprotected portions of the surface 25 of the first metal layer 21, and the second photoresist layer 30 has second open areas 40 therethrough which leave unprotected portions of the surface 26 of the metal layer 22. The metal layers 21 and 22 are etched completely through at the unprotected portions with a suitable etchant for these metal layers, producing first openings 43 in the first metal layer 21 and and second openings 44 in the second metal layer 22. An aqueous ferric chloride solution marketed under the name R.C.E. solution by Philip R. Hunt Chemical Corp., Palisades, N.J., is preferred. After the metal layers 21 and 22 are etched, the etched laminate is rinsed with deionized water and dried. The etching, rinsing and drying are conducted either in darkness or in nonactinic light with respect to the photosolubilizable insulator layers 27 and 28.

Next, as shown in FIG. 5, the joined insulator layers 27 and 28 and the developed photoresist layers 29 and 30 or stencils are exposed to a flood of actinic light from both sides as indicated by the arrows 41 and 42. Optionally the insulator layers 27 and 28 may be exposed to actinic light from only one side. The light-exposed portions of the insulator layers 27 and 28 and the photoresist layers or stencils 29 and 30 are solubilized because they are positive-acting. The light-exposed portions are then developed; that is, removed with a developing solution as described above with respect to developing a positive-acting photoresist, leaving insulating spacers (the residue of joined insulator layers 27 and 28) with openings 45 therethrough.

In the alternative case when the photoresist layers or stencils 29 and 30 are negative acting, the stencils 29 and 30 may be removed before exposing the insulator layers 27 and 28. Alternatively, the stencils 29 and 30 may be exposed and insolubilized and then, after developing the insulator layers 27 and 28, the stencils 29 and 30 may be removed as shown in FIG. 6, or they may be left in place.

Figure 7:
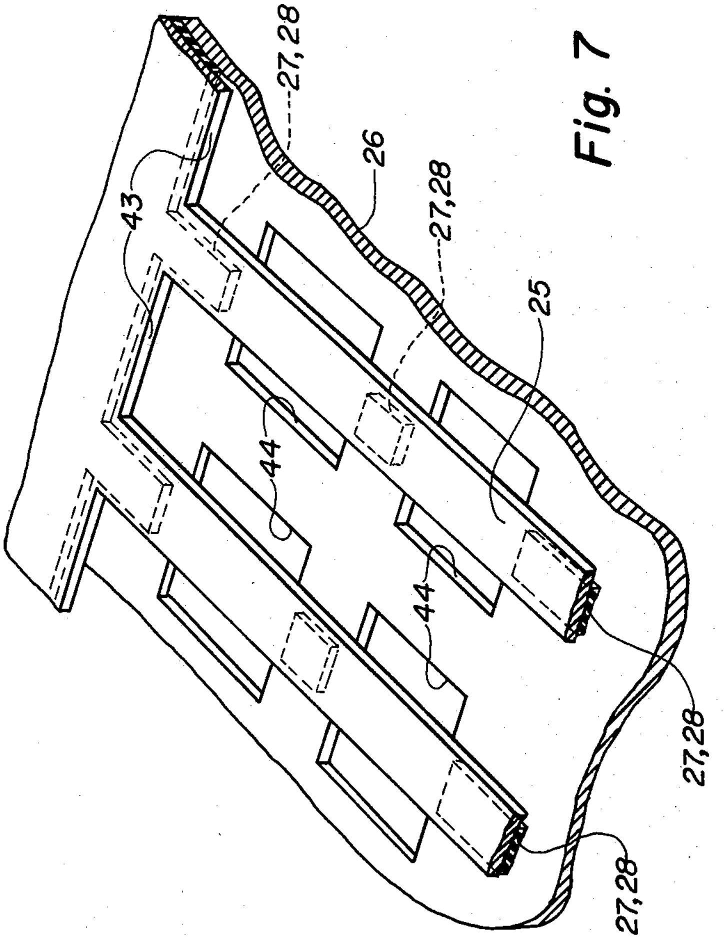
FIG. 7 is a perspective view of a fragment of a focus mask made by the first embodiment and FIG. 8 is a sectional view of an apparatus which illustrates a sequence of steps in a second embodiment of the novel method.

The product of the novel method is an apertured plate having an array of parallel conductors 25 insulatingly held thereto with unexposed portions of insulator layers 27 and 28 as shown in FIGS. 6 and 7. Each of these structures is precisely shaped and positioned with respect to one another. The insulator layers 27 and 28 are undercut by the developing and are not in the line of sight, which minimizes the possibility of electrostatic charging from scanning electron beams and stray electrons when the structure is used as a mask in a CRT.

Figure 8:
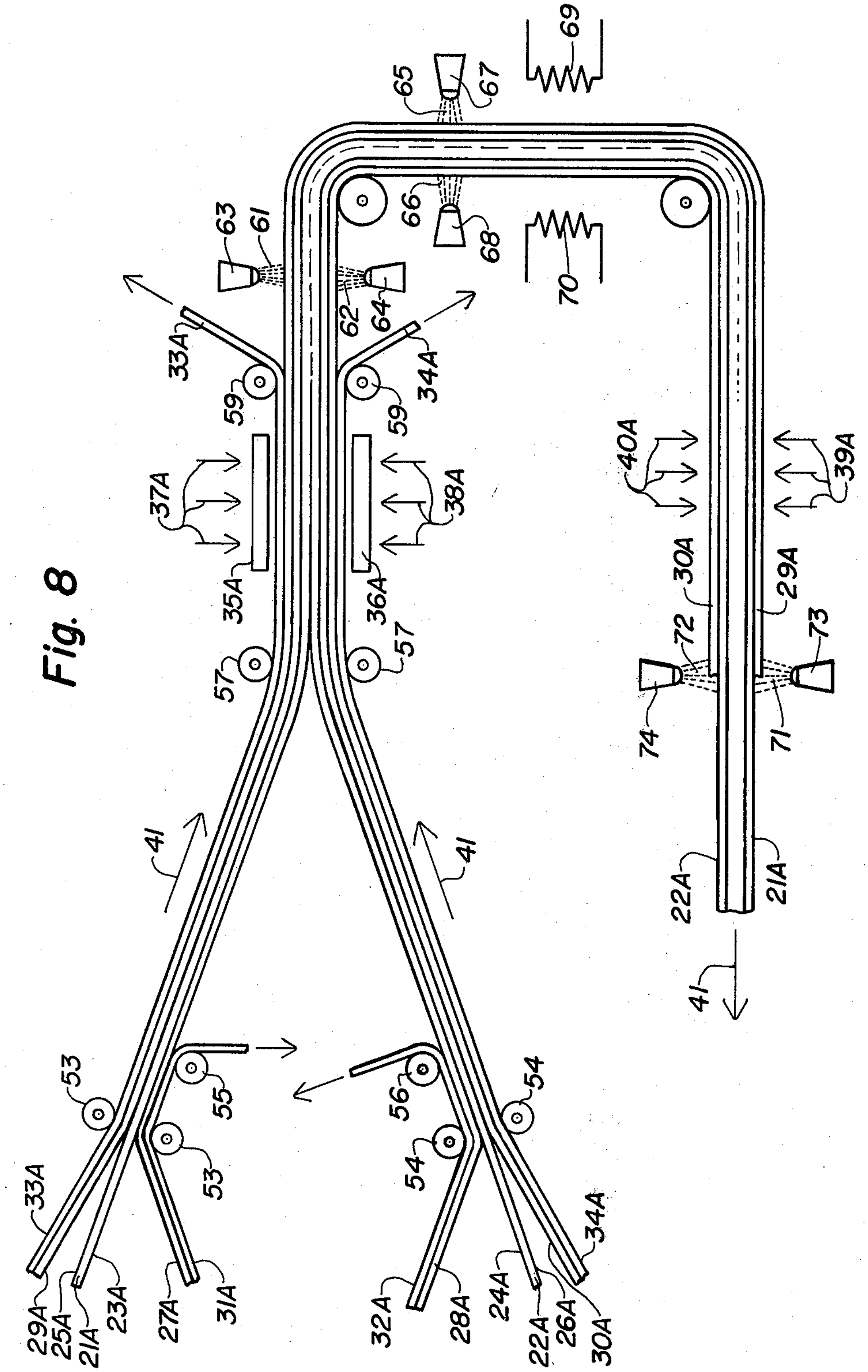

FIG. 8 shows a continuous-flow embodiment of the novel method. Structures that are similar to the first embodiment bear the same reference numeral followed by the letter A. First and second metal foils 21A and 22A are fed continuously in parallel through a plurality of stations in the direction of the arrows 41. Prior to the first station, strips of photosolubilizable insulator 27A and 28A, each backed with a layer of Mylar sheeting 31A and 32A, are fed in parallel along the inner facing surfaces 23A and 24A of the metal foils 21A and 22A. At the same time, strips of photoresist 29A and 30A, each backed by a layer of Mylar sheeting 33A and 34A, are fed in parallels along the outer facing surfaces 25A and 26A of the metal foils 21A and 22A.

At the first station, the strips feed between first heated pressure rollers 53 and 54 which laminate the photosolubilizable insulator layers 27A and 28A and the photoresist layers 29A and 30A to the metal foils 21A and 22A respectively.

At the second station, the inner Mylar sheetings 31A and 32A are peeled from the insulator layers 27A and 28A by pulling them around first stripping rollers 55 and 56. At the third station, the strips feed between second pressure rollers 57 which heat and press the insulator layers 27A and 28A together, and they are joined.

At the fourth station, first and second photographic masters 35A and 36A track with the moving laminate and expose the photoresist layers 29A and 30A by contact exposure to different photographic patterns with actinic light as indicated by the arrows 37A and 38A.

At the fifth station, the outer Mylar sheetings 33A and 34A are peeled from the photoresist layers 29A and 30A by pulling them around second stripping rollers 59. At the sixth station, jets 61 and 62 liquid developer are sprayed from the first developer nozzles 63 and 64 upon the exposed photoresist layers 29A and 30A in such manner as to remove the more-soluble portions thereof.

At the seventh station, jets of liquid etchant 65 and 66 are sprayed from the etchant nozzle 67 and 68 in such manner as to etch away those portions of the metal foil 21A and 22A that are not protected by the photoresist layers 29A and 30A. At the eighth station, the outer surfaces of the laminate are dried by infrared radiation from the heaters 69 and 70.

At the ninth station, the dry laminate passes between sources of flooding actinic light 39A and 40A exposing the photoresist layers 29A and 30A and the joined insulator layers 27A and 28A to solubilizing radiation in the regions thereof that are not covered. At the tenth station, jets of liquid developer 71 and 72 are sprayed from the second developer nozzles 73 and 74 in such manner as to remove the solubilized portions of the insulator layers 27A and 28A and also to remove the stencils; that is, the residue of the photoresist layers 29A and 30A.

I claim:

1. A method of fabricating a color-selection structure for a cathode-ray tube comprising A. providing a blank laminate consisting essentially of a positive-acting photosolubilizable central insulator layer, first and second etchable metal layers adhered to opposite major surfaces of said insulator layer, and first and second etch-resistant stencils contacting major surfaces of said first and second metal layers respectively, said stencils having different, related open areas therethrough which leave selected portions of said metal layers unprotected, B. etching through said first metal layer in said selected portions of said first metal layer to produce an apertured plate consisting essentially of first openings in said first metal layer, C. etching through said second metal layer in said selected portions of said second metal layer to produce an array of parallel conductors consisting essentially of second openings in said second metal layer, D. exposing said insulator layer to actinic light through said first openings and said second openings, E. and then removing solubilized portions of said insulator layer.

2. The method defined in claim 1 wherein, at step D., said central layer is exposed to actinic light through both of said first openings and said second openings.

3. The method defined in claim 1 wherein said blank laminate is prepared by steps including providing two metal strips, each strip having a coating of a positive-acting photoresist on a major surface thereof, moving said metal strips in the same direction in closely-spaced relationship with one another, and then joining together said coatings of said moving strips.

4. The method defined in claim 1 wherein said laminate is prepared by steps including providing two etchable metal strips having opposed major surfaces, moving said metal strips in the same direction in closely-spaced relationship with one another, coating each major surface of each moving strip with a layer of positive-acting photoresist, joining together one of said coatings on each of said moving strips, thereby producing said central layer, exposing the other coating on one of said moving strips to an actinic light image, exposing the other coating on the other of said moving strips to another substantially different actinic light image and then developing each of said exposed other coatings thereby producing said first and second stencils respectively.

* * * * *

UNITED STATES PATENT AND TRADEMARK OFFICE
CERTIFICATE OF CORRECTION

PATENT NO. : 4,341,591

DATED : July 27, 1982

INVENTOR(S) : Donald James Tamutus

It is certified that error appears in the above-identified patent and that said Letters Patent is hereby corrected as shown below:

| | |
|---|---|
| Column 3, line 47 | change "layer" to --layers-- |
| Column 6, line 10 | after "openings," add --thereby solubilizing selected portions of said insulator layer,-- |

Signed and Sealed this

*Thirtieth* Day of *November 1982*

[SEAL]

*Attest:*

GERALD J. MOSSINGHOFF

*Attesting Officer* *Commissioner of Patents and Trademarks*